United States Patent [19]
Anderson

[11] Patent Number: 6,008,951
[45] Date of Patent: Dec. 28, 1999

[54] OFFSET PROJECTION ZOOM LENS WITH FIXED REAR GROUP FOR REFLECTIVE SPATIAL LIGHT MODULATORS

[75] Inventor: Douglas W. Anderson, Richardson, Tex.

[73] Assignee: Texas Instruments Incorporated, Dallas, Tex.

[21] Appl. No.: 09/000,685

[22] Filed: Dec. 30, 1997

Related U.S. Application Data

[60] Provisional application No. 60/034,976, Dec. 31, 1996.

[51] Int. Cl.⁶ .............................. G02B 15/15; G02B 15/14
[52] U.S. Cl. ............................................ 359/677; 359/680
[58] Field of Search .................................... 359/649, 677, 359/680, 683, 689, 691

[56] References Cited

U.S. PATENT DOCUMENTS 3,819,256  6/1974  Bellows et al. ............................... 351/6
5,619,381  4/1997  Anderson ................................. 359/677

*Primary Examiner*—Georgia Epps
*Assistant Examiner*—Ricky Mack
*Attorney, Agent, or Firm*—Charles A. Brill; Frederick J. Telecky, Jr.; Richard L. Donaldson

[57] ABSTRACT

An offset reverse telephoto projection zoom lens 300 comprising a moving zoom group 302, a moving compensation group 304, and a fixed rear lens group 306. According to one embodiment of the projection lens, the zoom group 302 has four lenses, the compensation group 304 has four lenses, and the fixed rear group 306 has three lenses. An aperture stop 308 is located in the fixed rear group 306. The fixed rear group 306 has a small diameter which helps alleviate interference with illumination optics. Additionally, a fixed rear group 306 does not require zoom mechanisms at the rear of the lens 300 where space is at a premium.

20 Claims, 5 Drawing Sheets

OFFSET PROJECTION ZOOM LENS WITH FIXED REAR GROUP FOR REFLECTIVE SPATIAL LIGHT MODULATORS

This application claims priority under 35 USC 119(e)(1) of provisional application No. 60/034,976 filed Dec. 31, 1996.

CROSS-REFERENCE TO RELATED APPLICATIONS

The following patents and/or commonly assigned patent applications are hereby incorporated herein by reference:

| Patent No. | Filing Date | Issue Date | Title |
|---|---|---|---|
| 5,619,381 | June 2, 1995 | April 8, 1997 | Offset Zoom Lens for Reflective Light Modulators |
| 60/031,525 | Nov. 29, 1996 | | Offset Projection Lens for Reflective Light Modulators |

FIELD OF THE INVENTION

This invention relates generally to lenses for use with projection optical systems, particularly to lenses for use with reflective spatial light modulators, and more particularly to projection zoom lenses for use with a digital micromirror device (DMD).

BACKGROUND OF THE INVENTION

Projection optical systems present many optical design challenges, several of which require a tradeoff between conflicting design goals. Foremost is the requirement of producing a high-quality image, characterized by low distortion, high resolution, high contrast ratio, high light throughput, and uniform screen illumination. In addition to the image quality requirement, the operational environment for many optical projectors introduces further constraints. For example, many projectors must project images large enough to be seen by many people, yet operate in a rather small conference room. This constraint requires the projection system to have a relatively wide field angle so that a large image may be produced in spite of a short projection distance.

Additionally, projection systems are rarely positioned level with the center of the projection screen. Because the projector system and the center of the screen are not located at the same elevation, the image may exhibit a keystoning effect. Keystoning occurs when an image is projected at an angle onto a screen, such as when a table-top overhead projector projects an image upward onto a wall screen. Due to the projection angle, the side of the image furthest from the projector, typically the top, is wider than the side of the image closest to the projector—causing the image to resemble the wedge-shaped keystone at the crown of a stone archway. Wide field angles exacerbate the problem of keystoning.

Furthermore, some application require a zoom lens to allow the projector to adapt to various operating environments. Projection zoom lenses are difficult to combine with reflective modulators since they must allow adequate room behind the lens to separate the incident and reflected light beams. The incident and reflected beams are nearly coincident when a reflective modulator is used. When the incident and reflected beams are so close, it is very difficult to prevent the projection optics from interfering with the illumination optics while limiting the overall size of the projector. Vignetting occurs when the illumination path is partially blocked by the projection optics.

Existing zoom lenses that have wide field angles, low distortion, high resolution, high contrast ratio, high light throughput, and uniform screen illumination are either too small format, have too short of a back focal distance to be useful for DMD based projection systems, or require too much space for the zoom mechanism near the spatial light modulator and illumination optics.

Therefore, there is a need in the art for a high resolution projection zoom lens having a long back focal distance, a wide field angle, high contrast ratio, low distortion, high light throughput, and uniform screen illumination that may be used with a reflective spatial light modulator without interfering with the illumination optics.

SUMMARY OF THE INVENTION

It is a primary object of the present invention to provide a high resolution projection zoom lens having a wide field angle, a high contrast ratio, and a high light throughput, which provides uniform screen illumination and low distortion. Furthermore, the disclosed projection zoom lens has a small diameter fixed rear lens group coupled with a long back focal distance which allows it to be used with reflective light modulators without excessive interference with the illumination light path. Additionally, use of a fixed rear group allows the zoom mechanisms to be located away from the rear of the lens where space is at a premium. A further object of the present invention is to provide an image display system that uses a high resolution projection zoom lens having these characteristics.

According to one embodiment of the disclosed invention, a reverse telephoto projection zoom lens is provided. The projection zoom lens having a small diameter fixed rear lens group at a modulator end, an aperture stop within the fixed rear group, a moving compensation group, and a moving zoom group.

According to another embodiment of the disclosed invention, an image display system is provided. The image display system has a light source for generating a beam of light, a controller for generating electrical control signals, illumination optics for directing the beam of light onto a spatial light modulator, the spatial light modulator for receiving the electrical control signals and for selectively modulating the beam of light in response thereto, and a reverse telephoto projection zoom lens having a small diameter fixed rear lens group and a long back focal length for focusing said selectively modulated beam of light onto an image plane.

BRIEF DESCRIPTION OF THE DRAWING

For a more complete understanding of the present invention, and the advantages thereof, reference is now made to the following description taken in conjunction with the accompanying drawings, in which.

DETAILED DESCRIPTION OF THE PREFERRED EMBODIMENTS

Figure 1:
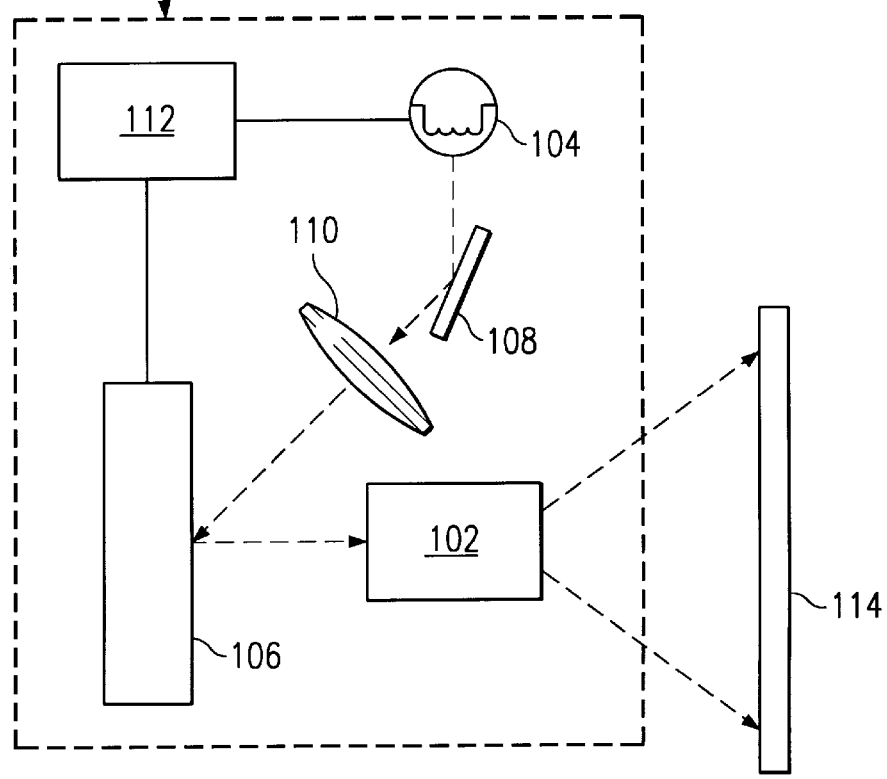
FIG. 1 is a block diagram of a projection display system showing a projection zoom lens according to the present invention in conjunction with a reflective spatial light modulator.

A schematic diagram of an image projection system 100 using a projection zoom lens 102 according to the present invention is shown in FIG. 1. In FIG. 1, a light source 104, typically an arc-lamp, generates a beam of light which is focused onto a spatial light modulator (SLM) 106 via a combination of mirrors 108 and lenses 110. For simplicity, the lenses and mirrors are represented in FIG. 1 by a single lens 110 and a single mirror 108, but it is understood that the lens 110 and mirror 108 of FIG. 1 may represent multiple configurations of lenses and mirrors, or even lenses and prisms as detailed in copending U.S. Pat. application Ser. No. 60/031,525.

Lens 110 focuses light from source 104 onto the SLM 106, and the SLM 106 modulates the light as directed by controller 112. The modulated light beam is focused onto projection screen 114 by projection zoom lens 102. Mirror 108 provides mechanical separation between the illumination optics and the projection zoom lens 102 by spatially separating the light beam shining on the SLM from the light beam reflected by the SLM. The separation function is especially important in displays systems in which the SLM is a DMD because a typical DMD element operates by rotating a mirror element only +/−10°, creating a mere 20° separation between the incident and reflected light beams. Such a small separation between the two light beams complicates the design of illumination and projection optics, and places a premium on space near the DMD since the complexity of both projection and illumination optics increases as the optics are moved away from the DMD.

Figure 2:
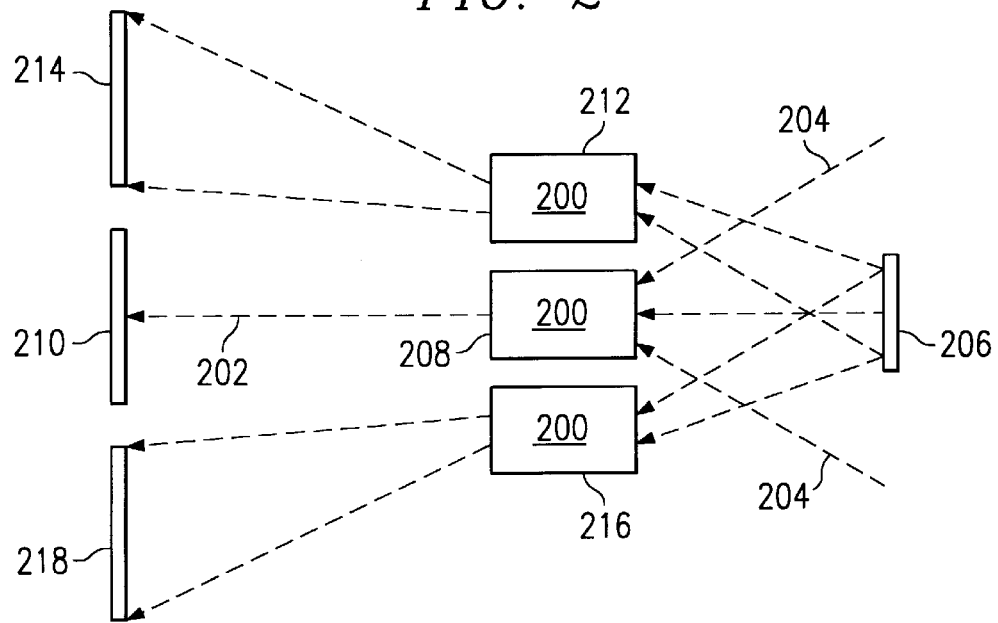
FIG. 2 is a schematic view of a projection lens showing the effects of offset projection.

FIG. 2 is a simplified pictorial representation of the operation of offset projection in a display system having greatly exaggerated offset angles. Offset projection occurs when the object format diameter of the projection zoom lens 200, or the largest object the projection zoom lens 200 is capable of imaging, is larger than the actual object being imaged and the object being imaged is not located on the lens axis 202. For example, projection zoom lens 200 has a field of view, as shown by rays 204, which at the object plane defines an object format diameter much larger than the object being imaged. When the projection zoom lens 200 is in position 208, the image of modulator 206 is projected by the projection zoom lens 200 onto the image plane at location 210. If the projection zoom lens 200 is moved upward in relation to modulator 206 to position 212, the image of the modulator 206 is shifted, or offset, across the image plane to location 214. Likewise, if the projection zoom lens 200 is moved downward in relation to modulator 206 to position 216, the image of the modulator 206 is shifted, or offset, across the image plane to location 218.

Offset projection can be used to prevent image keystoning when the image projector is not at the same elevation as the center of the projection screen. For example, when an on-axis projection system is mounted to a conference room ceiling and projects downward to the center of a wall mounted projection screen, the bottom of the image is wider than the top. If an offset projection zoom lens 200 is used, however, the projection zoom lens 200 is shifted down relative to the modulator 206 causing the image to he shifted down while retaining the correct image dimensions. Likewise, a projection zoom lens 200 shifted upward relative to the modulator 206 projects the image of the modulator upward, allowing a table-top projector to project an image upward onto a wall mounted screen without keystoning. In FIG. 2, the field of view shown by rays 204 is approximately four times as large as the modulator 206 being imaged. In practice, a lens with 400% offset is too expensive for most applications and the maximum offset is limited to 200% or less, typically less than 150%.

Figure 3:
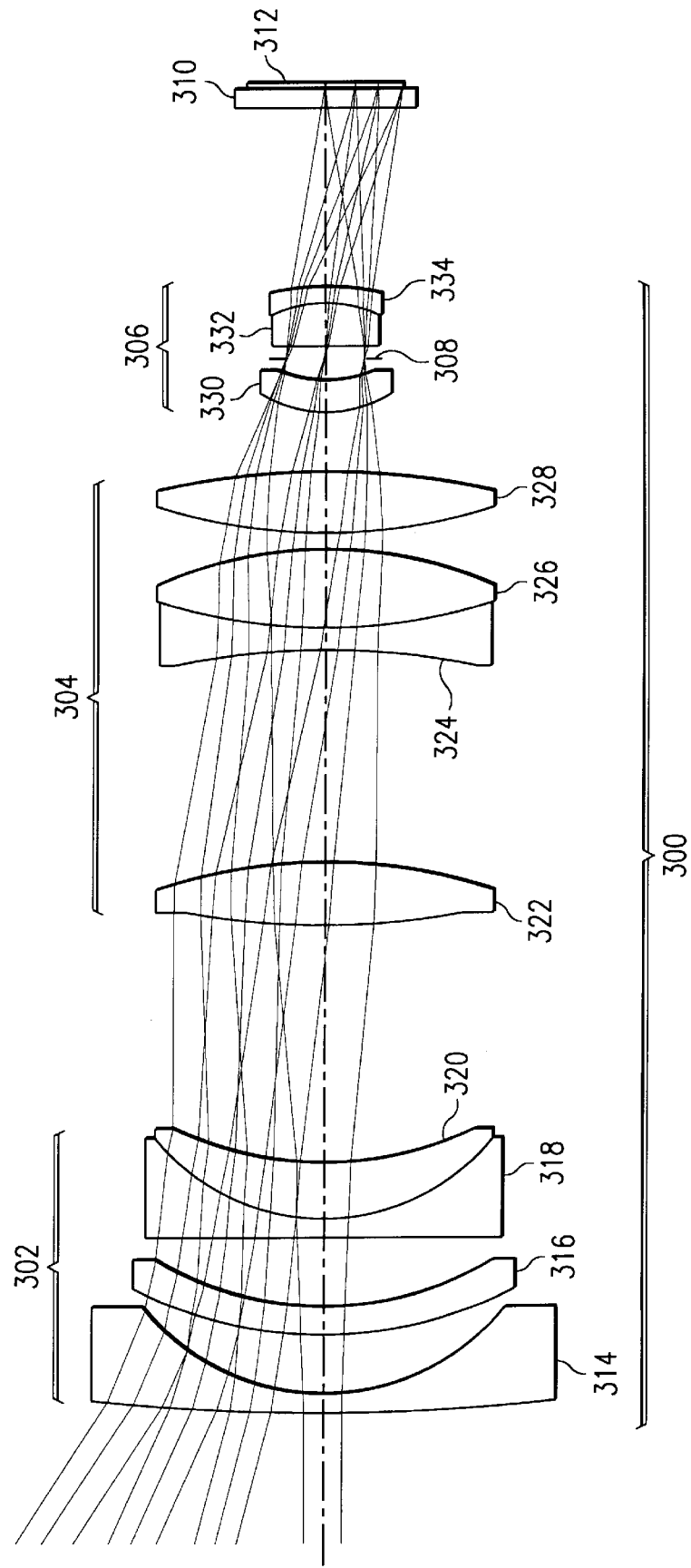
FIG. 3 is a schematic view of a projection zoom lens assembly according to a first embodiment of the present invention showing the projection zoom lens in high magnification, or short focal length, mode.

FIG. 3 is a schematic diagram of a projection zoom lens 300 according to one embodiment of the present invention. Projection zoom lens 300 is a reverse telephoto configuration lens and has wide field angles and high light throughput with low distortion, and projects a high resolution image with low intensity ghost reflections, while providing uniform screen illumination.

Projection zoom lens 300 includes two moving groups of lens elements, the zoom group 302 and the compensator group 304, and one fixed group of lenses, the fixed group 306.

According to the embodiment shown in FIG. 3, the zoom group 302 is composed of four lens elements, the compensator group 304 composed of four elements, and the fixed group 306 is composed of three lens elements. FIG. 3 also shows a cover or window 310 over the reflective light modulator 312. The window 310 is typically a 0.118 inch thick piece of Corning 7056 glass 1.220 inches behind the projection zoom lens 300 and 0.039 inches in front of the light modulator.

Window 310 is typically formed as part of the package for the reflective spatial light modulator 312. For example, DMD spatial light modulators are hermetically sealed in a ceramic integrated circuit package with a window 310 on the top of the package to allow light to enter and leave the package.

Table 1 details one embodiment of the disclosed projection zoom lens shown in FIG. 3. The zoom group 302 includes four lenses and has a negative power. The front lens 314 in the zoom group 302 is a negative lens. For the purposes of this disclosure, the "front" of the lens is toward the objective end or projection end and opposite the spatial light modulator end, or back end. Furthermore, the curvature of the surface, or radius, is positive if the center of curvature is on the modulator, or back, side of the lens. Therefore, a front surface of a lens is convex if it has a positive radius and concave if it has a negative radius, while the back surface of a lens is convex if it has a negative radius and concave if it has a positive radius. Additionally, the spacing between one lens and the next lens is measured from the rear vertex of the first lens to the front vertex of the next lens.

The second lens 316 in the zoom group 302 is a negative lens and has an aspheric rear surface. The rear surface of lens 316, as well as the front surface of lens 322 which is also aspherical, is represented by:

$$Z = \frac{ch^2}{1 + \sqrt{(1 - (1+k)c^2 h^2)}} + Ah^4 + Bh^6 + Ch^8 + Dh^{10}$$

where: Z is the sag of the surface parallel to the Z axis;

c is the curvature at the pole of the surface (1/radius of curvature);

k is the conic coefficient;

A,B,C,D are the 4th, 6th, 8th, and 10th order deformation coefficients; and h is the distance from the Z axis.

The third lens 318 in the zoom group 302 is a negative lens. The fourth lens 320 in the zoom group 302 is a positive lens and is cemented to the third lens 318 to form a cemented doublet. The cemented doublet helps to correct chromatic aberrations in the projection zoom lens assembly 300. As the zoom is adjusted, the distance between the zoom group 302 and the compensator group 304 varies from 0.591 inches to 1.654 inches.

The compensation group 304 includes four lenses and has a positive power. The first lens 322 at the front of the compensation group 304 is a positive lens with an aspheric front surface. The second lens 324 in the compensation group 304 is a negative lens. The third lens in the compensation group 304 is a positive lens and is cemented to the second lens 324 to form a cemented doublet. The fourth lens 328 in the compensation group 304 is a positive lens. As the zoom is adjusted, the distance between the compensation group 304 and the fixed rear group 306 varies from 1.319 inches to 0.395 inches.

The fixed rear group 306 includes three lenses. The first lens 330 at the front of the fixed rear group 306 is a positive lens. The second lens 332 in the fixed rear group 306 is a positive lens. The third lens 334 in the fixed rear group 306 is a negative lens and is cemented to the second lens 332 to form a cemented doublet. The fixed rear group also contains an aperture stop 308. Since the aperture stop is in the fixed rear group, the f-number of the system does not change with display magnification. Therefore, the display luminance increases as the image magnification decreases.

A key attribute of the disclosed lens design is the small diameter fixed rear group 306. The small diameter fixed rear group 306 reduces interference with the nearby illumination path, allowing the illumination path to be unvignetted, or nearly unvignetted. The small diameter is enabled by forcing the aperture stop as far toward the rear of the lens as possible. Forcing the aperture stop to the rear of the lens makes it more difficult to correct for several image aberrations including lateral color and distortion, both of which are very important in the image projection applications for which this lens is designed.

Fixing the location of the fixed rear group 306 eliminates the need for zoom lens mechanisms at the rear of the lens. As mentioned above, space is at a premium at the rear of the lens when a reflective spatial light modulator is used since the illumination and projection light paths are so close to each other. The disclosed lens design moves the zoom lens mechanisms toward the front of the lens where more space is available—simplifying the mechanical design of the zoom mechanism and reducing the likelihood of interference with the illumination light path. This enables integration of the projection zoom lens 300 with a reflective spatial light modulator since the zoom mechanism and moving components of the zoom lens are shifted forward where there is more room available. Shifting the moving components forward leaves more room for the illumination optics at the rear of the lens.

Figure 4:
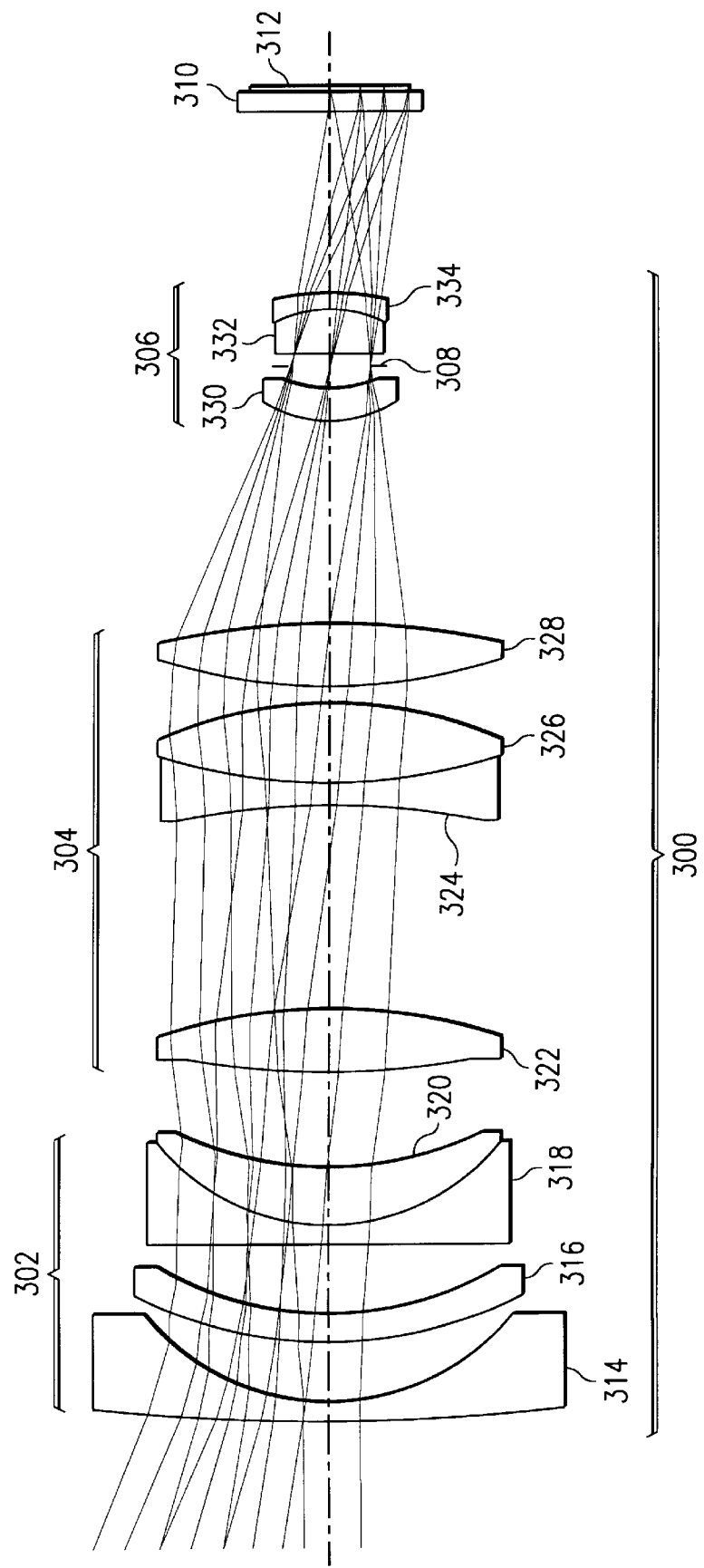
FIG. 4 is a schematic view of a projection zoom lens assembly according to a first embodiment of the present invention showing the projection zoom lens in low magnification, or long focal length, mode.
Figure 5:
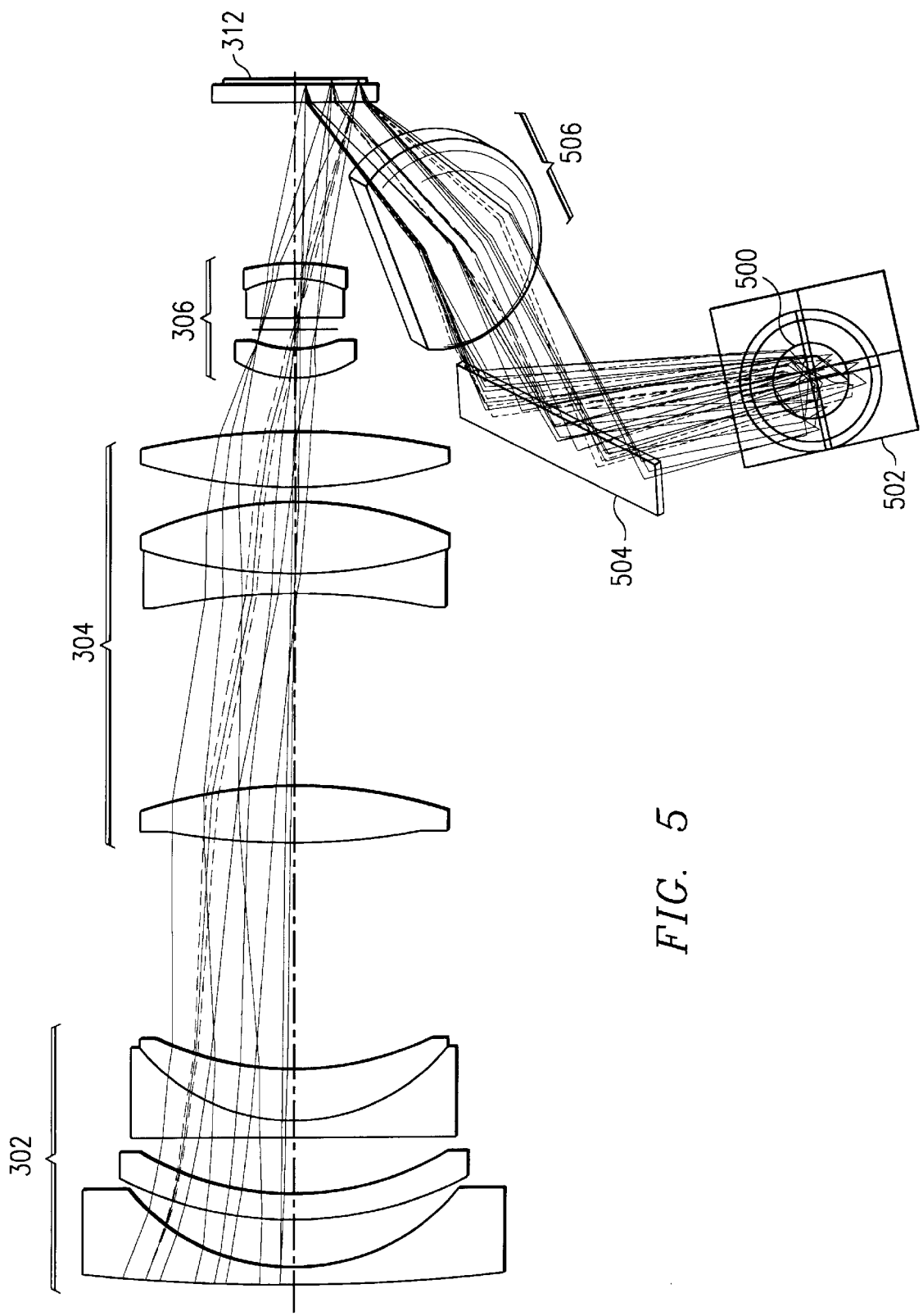
FIG. 5 is a schematic view of the projection zoom lens assembly of FIGS. 3 and 4 showing the illumination optics.
Figure 6:
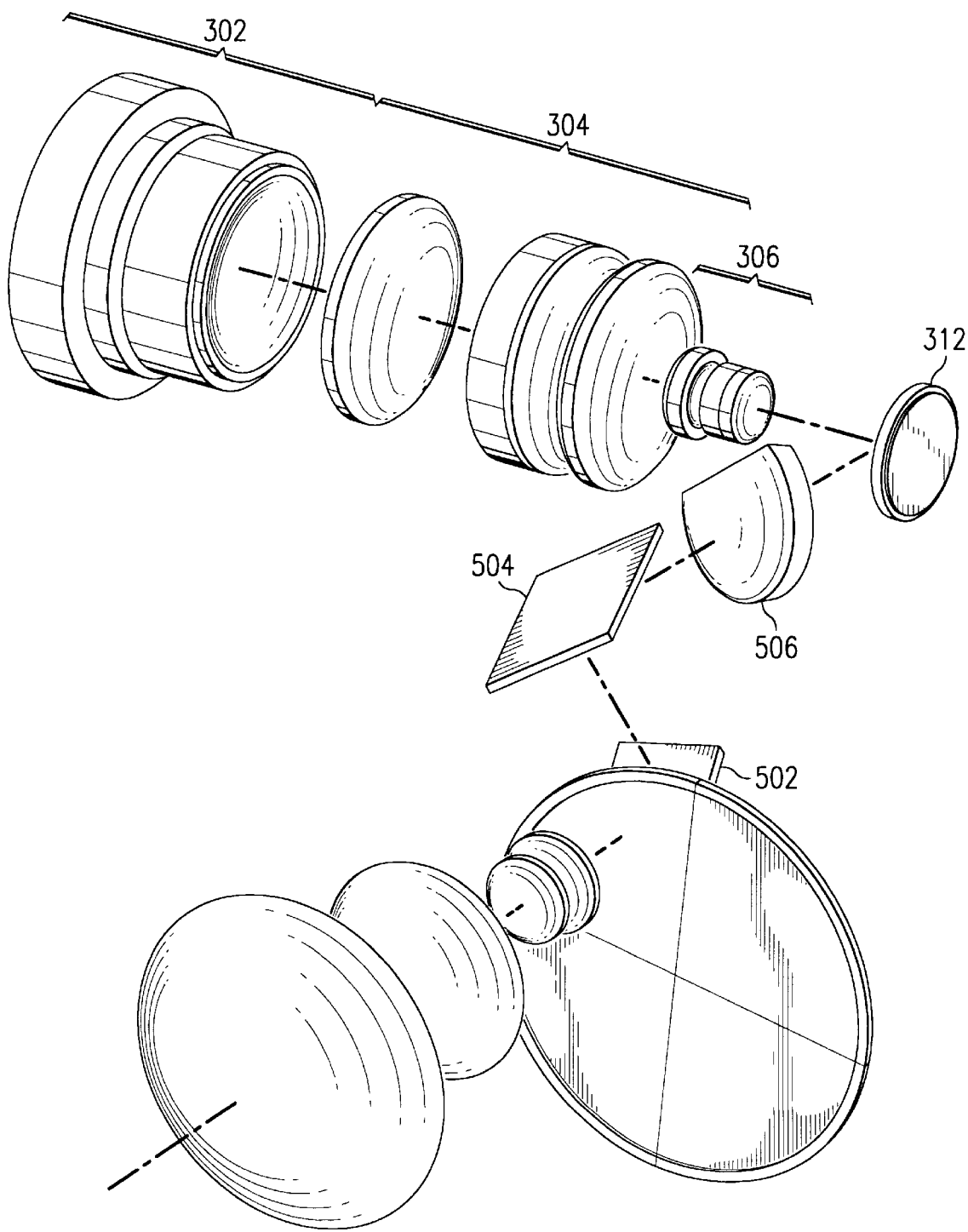
FIG. 6 is a prespective view of the projection zoom lens assembly and illumination optics of FIG. 5.

The projection zoom lens 300 is shown in high magnification mode, or short focal length mode, in FIG. 3. FIG. 4 shows the same projection zoom lens 300 in low magnification mode, or long focal length mode. In moving from low magnification mode to high magnification mode, the zoom and compensation groups are shifted away from each other. FIG. 5 shows the position of the projection zoom lens 300 relative to the illumination optics. In FIG. 5, the illumination optics include a light source and collection lenses 500, two fold mirrors 502, 504, and a truncated lens 506. Not shown in FIG. 5 is a color wheel between the light source and collection lenses 500 and fold mirror 502. Lens 506 is tilted and truncated to prevent interference between lens 506 and the fixed read group 306.

In addition to exceeding the requirements listed above for projection zoom lens 102, projection zoom lens 300 operates at about f/3 with no vignetting and has a nominal modulation transfer function (MTF) of 0.86 at 33 lp/mm on axis. The worst-case off-axis MTF is 0 69 in the tangential direction and 0.76 in the sagittal orientation, both at 33 lp/mm. The magnification of projection zoom lens 300 is from 67X lo 100X. Projection zoom lens 300 has a fixed back focal distance of 1.34 inches and an effective focal length of between 0.81 and 1.19 inches, yielding a ratio of BFD divided by EFL ranges from 1.13 to 1.66.

Projection zoom lens 300 has a full field-of-view ranging between 23.4 and 33.1 degrees, depending on the zoom setting, yielding a throw ratio of 1.47:1 to 2.19:1. The overall length from the front vertex of the first lens to the rear vertex of the last lens ranges between 7.34 inches in the high zoom mode and 7.479 inches in the low zoom mode. The overall length from the light modulator to the front of lens 314 is 8.86 inches. For this design, distortion is between +1.2 and −0.9%, and the principal image to ghost intensity ratio is between 600:1 and 700:1.

The projection zoom lens assembly 300 is suitable for projecting an image from an SVGA format DMD or other SLM 302. SVGA format DMDs have a nominal 848x600 pixel array with a diagonal dimension of about 0.7 inches. Projection zoom lens 300 has a field of view sufficient to provide an object format diameter of approximately 1.05 inches diagonally. The large field of view allows a full offset in the vertical field of view which helps to reduce keystoning when the projector is used to project onto a screen that is not centered on the axis of projection.

Thus, although there has been disclosed to this point a particular embodiment for a projection zoom lens assembly, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

TABLE 1

| Object | Front Radius of Curvature | Rear Radius of Curvature | Free Aperture Radius | Thickness | Material |
| --- | --- | --- | --- | --- | --- |
| Lens 314 | 20.32228 | 1.58793 | 1.457 | 0.118 | BK7 |
| Air Gap | | | | 0.350 | |
| Lens 316 | 2.77607 | 1.64482 (Aspheric) | 1.201 | 0.197 | Acrylic |
| k = −0.639507; A = −0.57971 E−1; B = −0.842607 E−2; C = −0.323853 E−3; D = 0.244174 E−3 | | | | | |
| Air Gap | | | | 0.421 | |
| Lens 318 | 103.23969 | 1.45406 | 1.122 | 0.118 | BAK4 |
| Lens 320 | 1.45406 | 2.38917 | 1.063 | 0.372 | SF4 |
| Air Gap$_{max}$ | | | | 1.654 | |
| Air Gap$_{min}$ | | | | 0.591 | |
| Lens 322 | 4.02156 | −3.54918 | 1.083 | 0.401 | Acrylic |

TABLE 1-continued

| Object | Front Radius of Curvature | Rear Radius of Curvature | Free Aperature Radius | Thickness | Material |
|---|---|---|---|---|---|
| (Aspheric) $k = 0$; $A = -0.433899$ E-1; $B = -0.293363$ E-2; $C = -0.126746$ E-2; $D = 0$ | | | | | |
| Air Gap | | | | 1.412 | |
| Lens 324 | −5.59265 | 3.85075 | 1.063 | 0.157 | SF4 |
| Lens 326 | 3.85075 | −2.56619 | 1.083 | 0.535 | BK7 |
| Air Gap | | | | 0.092 | |
| Lens 328 | 3.40112 | −4.83864 | 1.063 | 0.429 | SK16 |
| Air Gap$_{max}$ | | | | 1.319 | |
| Air Gap$_{min}$ | | | | 0.395 | |
| Lens 330 | 0.85593 | 0.71008 | 0.394 | 0.197 | SF4 |
| Air Gap | | | | 0.158 | |
| Stop | | | 0.256 | | |
| Air Gap | | | | 0.079 | |
| Lens 332 | 12.92339 | −0.84286 | 0.323 | 0.276 | BAK4 |
| Lens 334 | −0.84286 | −1.81434 | 0.346 | 0.118 | SF4 |

What is claimed is:

1. A reverse telephoto projection zoom lens, said projection zoom lens having an objective end and an opposite modulator end, said reverse telephoto projection zoom lens comprising:

a fixed rear lens group at said modulator end of said projection zoom lens for receiving light from said modulator end, said fixed rear lens group having a fixed aperture stop within said fixed rear lens group;

a moving compensation group for receiving light from said fixed rear lens group; and a moving zoom group for receiving light from said moving compensation group.

2. The lens of claim 1 having a field of view of at least 23 degrees.

3. The lens of claim 1 having a field of view between 23.4 degrees and 33.1 degrees.

4. The lens of claim 1 having an object format diameter of at least 1 inch.

5. The lens of claim 1 having a throw ratio between 1.47:1 and 2.19:1.

6. The lens of claim 1 having a magnification of at least 67X.

7. The lens of claim 1 having a magnification between 67X and 100X.

8. The lens of claim 1 having a fixed back focal distance of at least 1.34 inches.

9. The lens of claim 1 having an effective focal length of at least 0.81 inches.

10. The lens of claim 1 having an effective focal length between 0.81 and 1.19 inches.

11. The lens of claim 1 having a back focal distance to effective focal length ratio of at least 1.13:1.

12. The lens of claim 1 having a back focal distance to effective focal length ratio between 1.13:1 and 1.66:1.

13. An image display system for projecting an image, said image display system comprising:

a light source for generating a beam of light;

a controller for generating electrical control signals;

a reflective spatial light modulator for receiving said electrical control signals and for selectively modulating said beam of light in response to said electrical control signals;

illumination optics for directing said beam of light onto said spatial light modulator; and a reverse telephoto projection zoom lens for focusing said selectively modulated beam of light, said reverse telephoto projection zoom lens comprising:

a fixed rear lens group at said modulator end of said projection zoom lens for receiving light from said modulator end, said fixed rear lens group having a fixed aperture stop within said fixed rear lens group;

a moving compensation group for receiving light from said fixed rear lens group; and a moving zoom group for receiving light from said moving compensation group.

14. The image display system of claim 13, said reverse telephoto projection zoom lens having a field of view between 23.4 degrees and 33.1 degrees.

15. The image display system of claim 13, said reverse telephoto projection zoom lens having an object format diameter of at least 1 inch.

16. The image display system of claim 13, said reverse telephoto projection zoom lens having a throw ratio between 1.47:1 and 2.19:1.

17. The image display system of claim 13, said reverse telephoto projection zoom lens having a magnification between 67X and 100.

18. The image display system of claim 13, said reverse telephoto projection zoom lens having a fixed back focal distance of at least 1.34 inches.

19. The image display system of claim 13, said reverse telephoto projection zoom lens having an effective focal length between 0.81 and 1.19 inches.

20. The image display system of claim 13, said reverse telephoto projection zoom lens having a back focal distance to effective focal length ratio between 1.13:1 and 1.66:1.

* * * * *